United States Patent [19]

Kudo et al.

[11] 4,450,551
[45] May 22, 1984

[54] KEEL-TIPPED STYLUS, AND METHOD AND DEVICE FOR MAKING KEEL-TIPPED STYLUS

[75] Inventors: Toshiyuki Kudo, Hirakata; Kazuo Itoh, Matsubara; Masafumi Kitamura, Nara, all of Japan

[73] Assignee: Sanyo Electric Co., Ltd., Osaka, Japan

[21] Appl. No.: 388,634

[22] Filed: Jun. 15, 1982

[30] Foreign Application Priority Data

Jun. 19, 1981 [JP] Japan .................................. 56-95494
Sep. 14, 1981 [JP] Japan .................................. 56-145166

[51] Int. Cl.³ ........................... G11B 9/06; G11B 3/00
[52] U.S. Cl. ..................................... 369/173; 369/126; 51/109 R; 51/281 R
[58] Field of Search ...................... 369/126, 173, 151; 51/109 R, 281 R

[56] References Cited

U.S. PATENT DOCUMENTS

| 4,104,832 | 8/1978 | Keizet | 369/173 |
| 4,126,867 | 11/1978 | Fuhret et al. | 369/126 |
| 4,315,358 | 2/1982 | Hedel | 369/126 |
| 4,370,739 | 1/1983 | Wang et al. | 369/173 |

FOREIGN PATENT DOCUMENTS 2095021  9/1982  United Kingdom ................ 369/126

Primary Examiner—Steven L. Stephan
Attorney, Agent, or Firm—Armstrong, Nikaido, Marmelstein & Kubovcik

[57] ABSTRACT

A keel-tipped stylus has a constricted terminal portion which is mounted on narrow shoulders which is in turn mounted on wide shoulders. The keel-tipped stylus is formed from a V-shaped stylus which engages into a spiral groove formed in an abrasive lapping disc. As the lapping disc rotates, the V-shaped stylus runs along the groove to lap the constricted terminal portion together with the narrow and wide shoulders.

8 Claims, 37 Drawing Figures

KEEL-TIPPED STYLUS, AND METHOD AND DEVICE FOR MAKING KEEL-TIPPED STYLUS

BACKGROUND OF THE INVENTION

1. Field of the Invention

The present invention relates to a stylus for playback of high density information records, such as video discs, and also to method and device for forming such a stylus.

2. Description of the Prior Art

Generally, a video playback system of a variable capacitance form, such as CED system, includes a pickup stylus, having a thin conductive electrode, and a disc record having a relatively fine spiral groove (e.g., groove width 2.6 micrometers) formed thereon. The groove is previously formed with geometric indentations to carry information of picture and/or sound. The record substrate is provided in a shape of disc made of vinyl chloride containing carbon particles. During playback, the stylus engages the groove as the record is rotated by a supportive turntable, producing capacitive variations between the stylus electrode and the conductive record disc. Such capacitive variations are sensed to reproduce the prerecorded information.

In the system of the above described type, the use of a relatively fine record groove and the groove-engaging requirement for the pickup stylus result in a stylus end which is extremely small.

Figure 1:
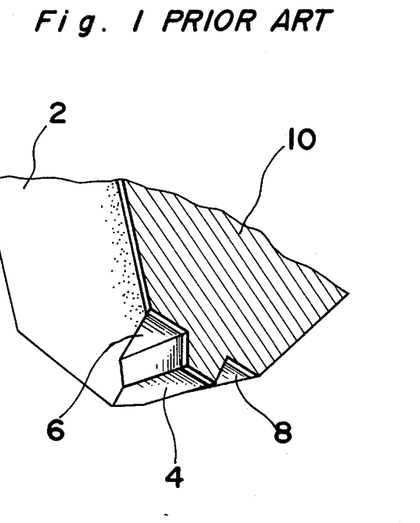
FIG. 1 is a perspective view of a stylus according to the prior art.

To improve the life of the stylus, a keel-tipped pickup stylus has been proposed. One example of prior art keel-tipped pickup stylus is shown in FIG. 1, which comprises a dielectric support element having a body 2, a fore-and-aft constricted terminal portion 4 and shoulders 6 and 8 joining the body 2 with the constricted terminal portion 4.

Figure 2:
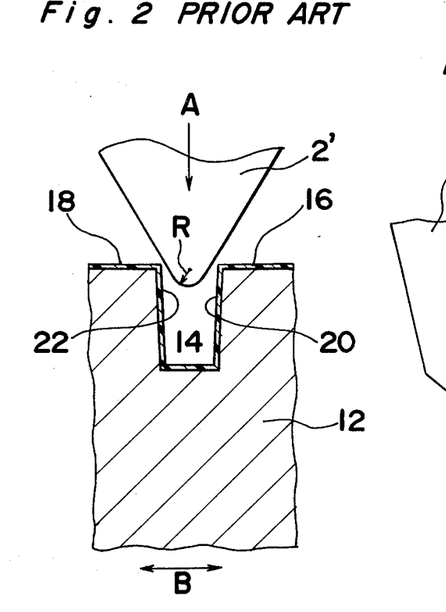
FIG. 2 is a diagrammatic view showing a method and device for manufacturing the stylus of FIG. 1.
Figure 3:
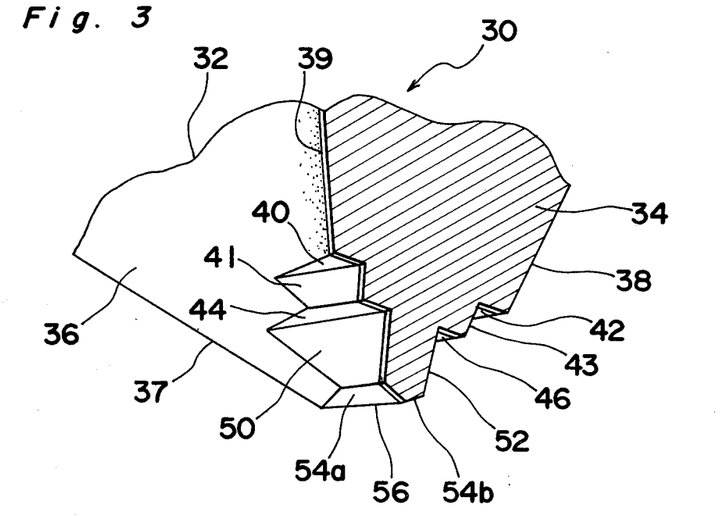
FIG. 3 is a perspective view of a stylus according to the present invention.

According to the prior art, the keel-tipped stylus is formed by the steps of depositing the thin layer of electrode 10 on a V-shaped stylus by way of, e.g., vacuum deposition, and then, by running the V-shaped stylus 2' on an abrasive lapping disc 12 with a deep coarse-pitched groove 14, as shown in FIG. 2, with an application of a predetermined pressure in a direction indicated by an arrow A. The lands 16 and 18 on the lapping disc 12 lap the shoulders 6 and 8 and the walls 20 and 22 of the abrasive groove 14 form the parallel side faces of the constricted terminal portion 4. Such an example of prior art keel-tipped stylus is disclosed in U.S. Pat. No. 4,104,832 to Keizer, issued Aug. 8, 1978.

According to the prior art stylus, however, there is such a disadvantage explained below. During the deposition of the electrode 10, a material for the electrode 10 may be undesirably deposited on side faces of the body 2, as shown in FIG. 1 by dots. Such a material is densely deposited in a region close to the electrode 10 and becomes sparse as the distance to the electrode 10 becomes greater. The undesirably deposited material on the side face of the body 2, particularly of the densely deposited region, senses the information of the adjacent grooves. Furthermore, if the densely deposited region is relatively long in a direction perpendicular to the electrode 10, the undesirably deposited material senses more than one piece of information at a time. The sensed information by the undesirably deposited material is introduced in the wanted signal as noise signals.

In addition to the above, according to the prior art, there are such disadvantages in the method and device for making the stylus as explained below.

Since the groove 14 of the abrasive lapping disc 12 has a very narrow groove width, such as 2 micrometers, it is necessary to present the V-shaped stylus 2' with a sharp point to properly engage the point into the groove 14. For example, the point of the V-shaped stylus 2' should be so sharpened as to have a curvature less than 1 micrometer radius R, as indicated in FIG. 2.

Also, even if the V-shaped stylus 2' is sharply pointed, it is very difficult to bring the pointed end of the V-shaped stylus 2' in engagement with the groove 14. If it is failed to bring the pointed end of the V-shaped stylus 2' in engagement with the groove 14, the pointed tip will be situated on the land 16 or 18, resulting in lapping of the pointed tip. This occurs particularly when the groove 14 of the abrasive lapping disc 12 swerves one or more micrometer in the direction indicated by an arrow B in FIG. 2, and, therefore, the possibility of landing the pointed tip on the land 16 or 18 becomes high. In this case, the pointed tip becomes undesirably flattened and, therefore, the V-shaped stylus 2' must be expelled as an unacceptable stylus, or otherwise, it must be sharpened again.

Furthermore, during the lapping, the disc 12 may undesirably makes a pitching motion in a direction perpendicular to the arrow B. Such a pitching motion may throw up and temporarily disengage the stylus 2' from the groove 14. In this case, if the stylus 2' falls on the land 16 or 18, the pointed tip will be flattened. Even if the stylus 2' falls again into the groove 14, there is such a problem that the stylus 2' may be engaged in the groove 14 in a tilted relation thereto. In this case, the lapped stylus is not acceptable.

Figure 12:
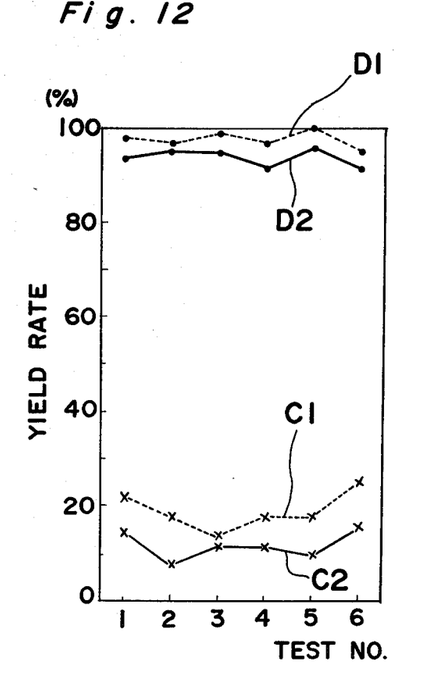
FIG. 12 is a graph showing a yield rate of the styli according to the prior art and present invention.

The above disadvantages in the method and device for making the stylus results in low yield rate. According to the tests carried out by the present inventors, the yield rate of styli according to the prior art showed very poor percentage as shown in graph of FIG. 12. In the graph of FIG. 12, abscissa and ordinate represent test number and yield rate in percentage, respectively. In the graph of FIG. 12, a line C1 shows percentages of styli which have been succeeded in engagement with the groove and, a line C2 shows percentage of styli which have been determined as acceptable. As apparent from the graph, the acceptable styli is about 10 percent. Therefore, according to the prior art, it results in high manufacturing cost to obtain acceptable styli.

SUMMARY OF THE INVENTION

The present invention has been developed with a view to substantially solving the above described disadvantages and has for its essential object to provide an improved stylus and also to provide an improved method and device for manufacturing the stylus.

It is also an essential object of the present invention to provide a stylus which can suppress the production of noise signals caused by the undesirably deposited material on the side faces of the stylus body near the constricted terminal portion.

It is also an essential object of the present invention to provide a method for manufacturing the stylus of the above described type with high yield rate and, thus reducing the manufacturing cost of the styli.

It is a further object of the present invention to provide a device for carrying out the above mentioned method.

In accomplishing these and other objects, a keel-tipped stylus according to the present invention comprises, a constricted terminal portion which is mounted on narrow shoulders which is in turn mounted on wide shoulders. The keel-tipped stylus, according to the present invention, is formed from a V-shaped stylus which engages into a spiral groove, or one of concentric circle grooves, formed in an abrasive lapping disc. As the lapping disc rotates, the V-shaped stylus runs along the groove to lap the constricted terminal portion together with the narrow and wide shoulders.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DESCRIPTION OF THE PREFERRED EMBODIMENTS

Referring to FIGS. 3 to 6, a keel-tipped stylus 30 according to the present invention comprises a body 32 made of electrically non-conductive, hard and brittle material, such as diamond, and an electric conductive film 34, such as a metal film comprising titanium, deposited on a front face of the body 32 by any known method, for example, a vacuum deposition method.

The body 32 is defined by: bevelled surfaces 36 and 38 intersecting at a prow line 37; and a front surface 39 extending between the bevelled surfaces 36 and 38 with a predetermined acute angle contained between the prow line 37 and the front surface 39. The front surface 39 is tapered, and is provided for depositing the electric conductive film 34. The body 32 is further defined by: first shoulders 40 and 42 extending, respectively, from opposite sides of the front surface 39 to the bevelled surfaces 36 and 38; second shoulders 44 and 46 provided adjacent to the first shoulders 40 and 42 on a tapered side and extending, respectively, from opposite sides of the front surface 39 to the bevelled surfaces 36 and 38; side surfaces 41 and 43 joining the first shoulders 40 and 42 to the second shoulder 44 and 46, respectively; and a fore-and-aft constricted terminal portion 48. The first and second shoulders 40, 42, 44 and 46 are parallel to each other and in perpendicular relation to an axis of the keel-tipped stylus, or they can be slightly slanted to define a downward slope towards the terminal portion 48. The side surfaces 41 and 43, however, are preferably tapered towards the constricted terminal portion 48.

Figure 5:
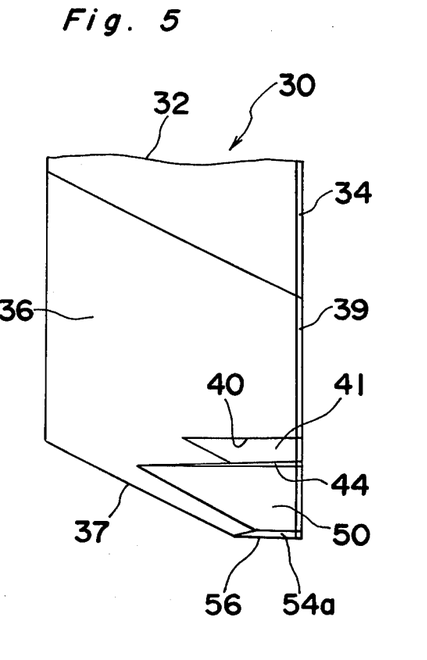
Figure 6:
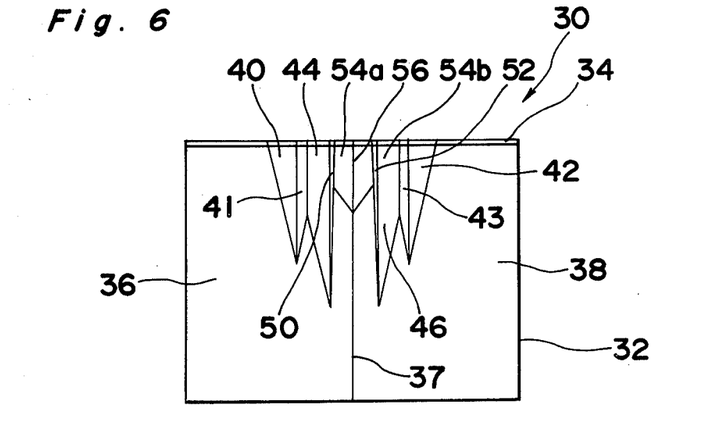

The constricted terminal portion 48 is defined by a pair of substantially parallel side surfaces 50 and 52 extending from the second shoulders 44 and 46, respectively, and a bottom surface 54. The side surfaces 50 and 52 can be slightly tapered towards the bottom surface 54. The bottom surface 54 is defined by a pair of slanted surfaces 54a and 54b which contain an angle of about 140 degrees to obtain a large contacting area with respect to the groove formed in the disc record. The slanted surfaces 54a and 54b intersects with each other along an apex line 56 which is in alignment with the prow line 37, when viewed from the bottom as shown in FIG. 6, but in bent relation with the prow line 37, when viewed from the side as shown in FIG. 5.

Figure 4:
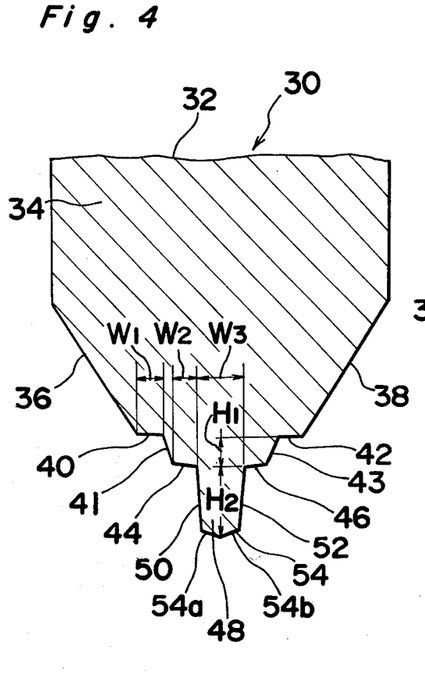
FIGS. 4, 5 and 6 are front, side and bottom views, respectively, of the stylus of FIG. 3.

According to the preferred embodiment, the configuration of the keel-tipped stylus 30 is symmetric about its axis, as viewed in FIG. 4, and the dimension of major parts of the keel-tipped stylus 30 is as follows. The width W1 of the first shoulder 40 or 42 is 0.5–3.0 micrometers, the width W2 of the second shoulder 44 or 46 is 1.5–2.0 micrometers, the width W3 of the terminal portion 48 is 2 micrometers, the height H1 of the side surface 41 or 43 is 2-3 micrometers, and the height H2 of the terminal portion 48 is 4 micrometers. The length of the apex line 56 is 4-5 micrometers. Furthermore, an angle contained by the bevelled surfaces 36 and 38 is 50-60 degrees.

It is to be noted that the electric conductive film 34, which has been described as deposited entirely on the front face of the body 32, can be deposited partly on the front face of the body 32 in a shape of elongated belt having the width W3 extending upwardly from the terminal portion 48.

Next, the steps and device for manufacturing the keel-tipped stylus 30 described above is explained in connection with FIGS. 7 to 9.

Figure 7:
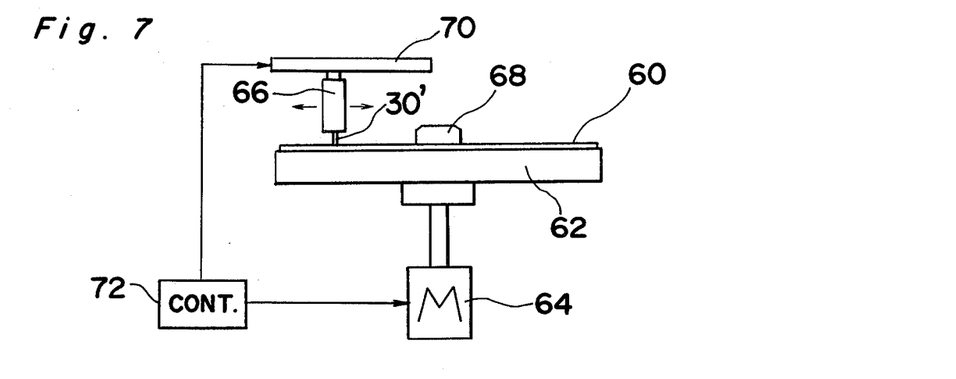
FIG. 7 is a diagrammatic view showing a device for manufacturing a stylus according to the present invention.

Referring particularly to FIG. 7, a device for manufacturing the keel-tipped stylus 30 comprises an abrasive lapping disc 60 mounted on a supportive turntable 62, a motor 64 connected to the turntable 62 and a holder 66 for holding a stylus to be abrased (hereinafter referred to as a V-shaped stylus 30' in contrast to the keel-tipped stylus 30). A clamper 68 is mounted on the abrasive lapping disc 60 to tightly hold the lapping disc 60 between the turntable 62 and the clamper 68. The device shown further comprises a scanner 70 for scanning the holder 66 in a radial direction over the lapping disc 60, and an electric control 72 for controlling the speed of rotation of the motor 64 and for controlling the speed of scan of the holder 60 relatively to the speed of the motor 64.

Figure 8:
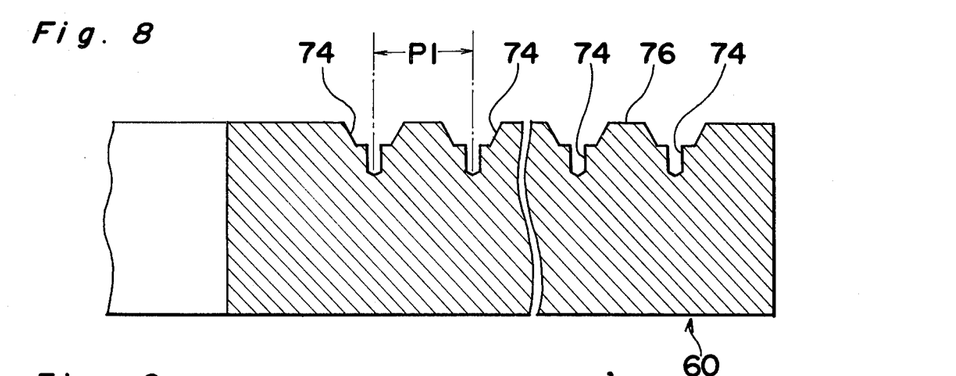
FIG. 8 is a cross-sectional view in an enlarged scale of an abrasive lapping disc according to the present invention.

Referring to FIG. 8, the abrasive lapping disc 60 is formed by a flat plate having a spiral groove 74 formed therein. A pitch P1 between two adjacent grooves 74 and 74 is preferably about 10 to 15 micrometers. Defined between the grooves 74 and 74 are lands 76. An abrasive material, such as grain of diamond is deposited on the plate to form an abrasive layer 78, as best shown in FIG. 9.

It is to be noted that the groove 74, which has been described as formed in spiral on the plate, can be formed in concentric circles.

Figure 9:
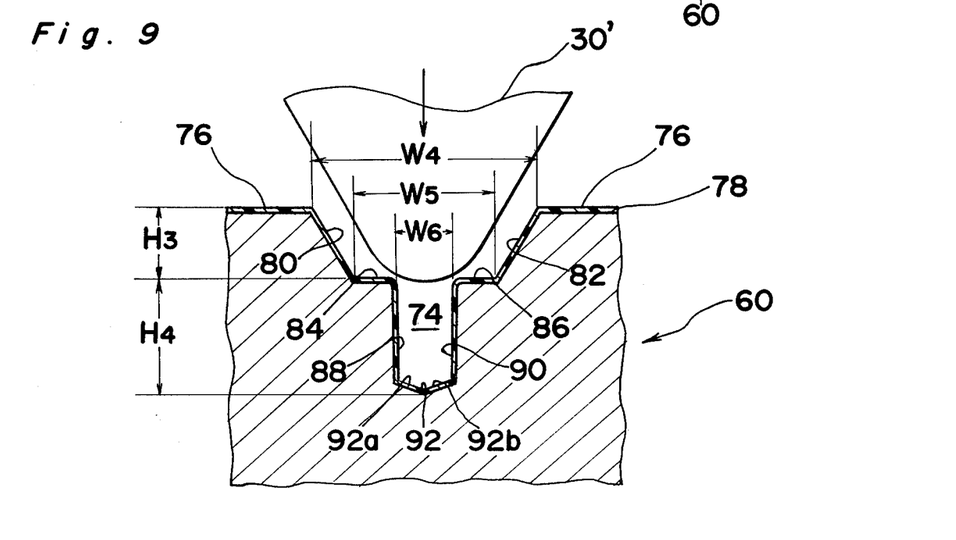
FIG. 9 is a diagrammatic view showing a cross-section of a groove formed in the abrasive lapping disc of FIG. 8.

Referring to FIG. 9, the groove 74 is defined by side walls 80 and 82 extending from the lands 76 and so slanted as to widen the opening of the groove 74, shelves 84 and 86 extending from the side walls 80 and 82, respectively, a pair of side walls 88 and 90 extending downwardly from the shelves 84 and 86, respectively, and a bottom wall 92 defined by walls 92a and 92b slanted downwardly towards the center of the groove 74.

As apparent from the above description given to the keel-tipped stylus 30, the side walls 88 and 90 can be parallel to each other or can be slightly tapered towards the bottom of the groove. Furthermore, the shelves 84 and 86 can be parallel to the land 76 or can be slightly slanted downwards to the center of the groove 74. Moreover, the bottom walls 92a and 92b are so slanted as to contain an angle of 140 degrees.

According to the preferred embodiment, the configuration of the groove 74 is symmetric about its axis, as viewed in FIG. 9, and the dimension of major parts of the groove is as follows. The width W4 of opening of the groove 74 is 8-9 micrometers, the width W5 measured between farther edges of the shelves 84 and 86 is 4-5 micrometers, the width W6 between the side walls 88 and 90 is 2 micrometers, the height H3 of the slanted side wall 80 or 82 is 2-3 micrometers, and the height H4 of the side wall 88 or 90 is 4 micrometers.

Next, the steps for manufacturing the keel-tipped stylus 30 is explained.

First, the V-shaped stylus 30' is fixedly attached to the holder 66 which is initially located above the perimeter portion of the abrasive lapping disc 60. The V-shaped stylus 30' is previously lapped to present a pointed end, such as a pointed end of a pyramid, and is deposited with the conductive electrode film. Then, the V-shaped stylus 30' held by the holder 66 is gently lowered down until the tip of the V-shaped stylus 30' comes in contact with the running disc 60 with a predetermined pressure. According to the preferred embodiment, the V-shaped stylus 30' should engage the groove 74 in a slight tilted manner towards forwards such that an angle contained between the electrode film 34 and the face of the abrasive lapping disc 60 is about 85 degrees.

Since the opening of the groove 74 is relatively wide when compared with the width of the land 76, the tip of the V-shaped stylus 30' engages in the groove 74 with a high percentage above 90. Furthermore, since the opening of the groove 74 is relatively wide, it is possible to engage a V-shaped stylus 30' having a tip with a relatively large radius, such as 4 or 5 micrometers.

As the turntable 62 rotates, the V-shaped stylus 30' slidingly runs along the groove 74 to lap the tip of the V-shaped stylus 30'. More particularly, the lands 76 on the lapping disc 60 lap the first shoulders 40 and 42; the side walls 80 and 82 lap the side surfaces 41 and 43; shelves 84 and 86 lap the second shoulders 44 and 46; side walls 88 and 90 lap the side surfaces 50 and 52; and the bottom walls 92a and 92b lap the slanted surfaces 54a and 54b of the bottom surface 54. When the V-shaped stylus 30' runs over the abrasive lapping disc 60 for a required distance, a completed keel-tipped stylus 30 is obtained.

During lapping, the scanner 70 shifts the holder 66 towards the center of the disc 60 in a speed of one pitch P1 per one rotation of the disc 60. Therefore, the V-shaped stylus 30' can be applied with a pressure substantially perpendicular to the face of the disc 60.

Figure 10:
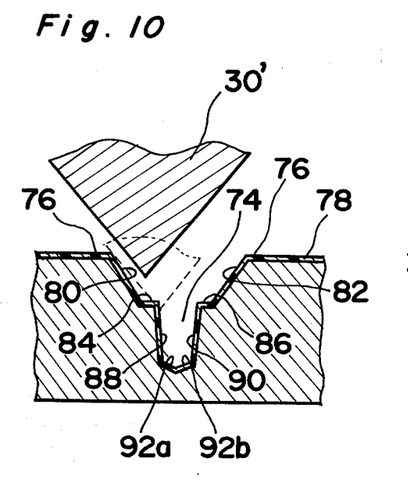
FIG. 10 is a diagrammatic view showing an acceptable manner of the engagement between the stylus and the groove.
Figure 11:
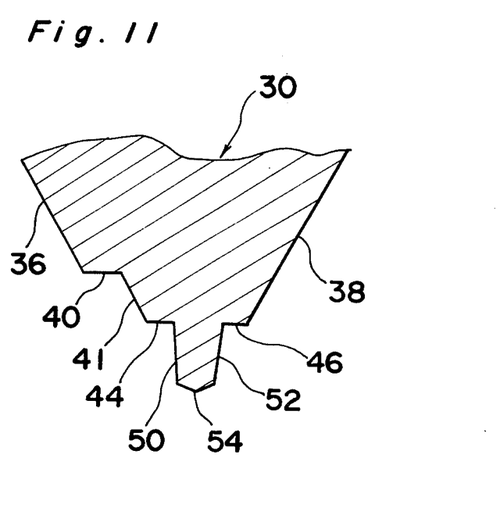
FIG. 11 is a front view of a stylus formed by the manner of FIG. 10.

Referring to FIG. 10, there is shown a case in which the V-shaped stylus 30' is directed towards the groove 74 in offset relation with respect to the center of the groove 74. When this happens, a keel-tipped stylus 30 as shown in FIG. 11 can be obtained. In other words, a keel-tipped stylus having the first shoulder 40 only on one side thereof is obtained.

According to the tests carried out by the present inventors, the yield rate of styli according to the method and device of the present invention showed an excellent percentage as shown in graph of FIG. 12. In the graph of FIG. 12, a line D1 shows percentages of styli which have succeeded in engagement with the groove and, a line D2 shows percentage of styli which have been determined as acceptable. As apparent from the graph, the styli which have succeeded in engagement is nearly 100 percent and the acceptable styli is about 90 percent of all the tested pieces. Therefore, according to the present invention, a very few V-shaped styli fail to become keel-tipped styli. Thus, the manufacturing cost can be reduced.

It is to be noted that the holder 66 can hold a plurality of V-shaped styli 30' at the same time to form a plurality of keel-tipped styli 30 by one operation. In this case, the plurality of V-shaped styli 30' can be aligned in series to locate the styli 30' along the groove 74 or in parallel to locate the styli 30' in adjacent grooves 74.

Figure 13:
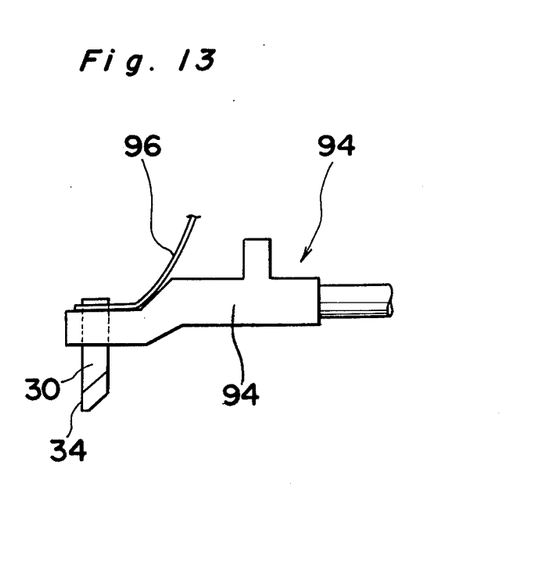
FIG. 13 is a diagrammatic view showing a manner in which the stylus of the present invention is held by a cantilever.

When in use, the keel-tipped stylus 30 is mounted to a known cantilever 94 having a stylus support 96, as shown in FIG. 13. The electric conductive film 34, which is deposited on the body of the stylus 30, is electrically connected to a flylead 96 which serves not only as a terminal for producing signal from the electric conductive film 34, but also as a spring means to provide a predetermined pressure between the keel-tipped stylus 30 and a disc record 98 (FIG. 14).

Figure 14:
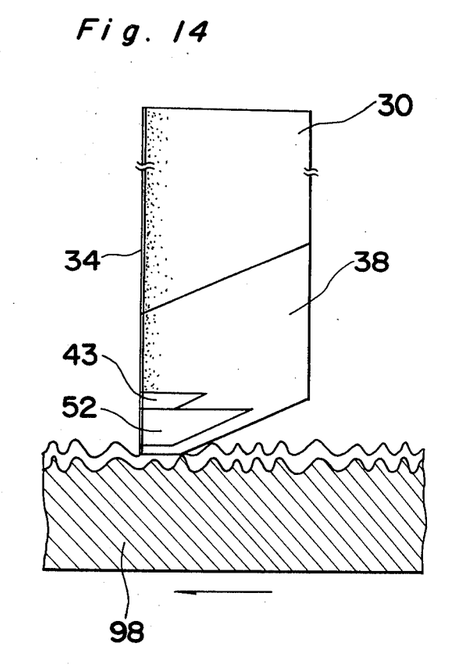
FIGS. 14 and 15 are side and front views, respectively, showing an engagement between the stylus of the present invention and disc record.
Figure 15:
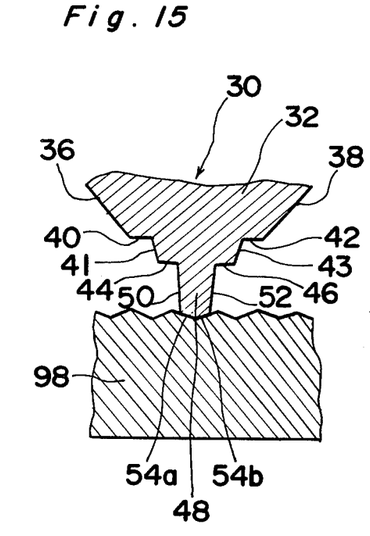

The disc record 98 as shown in FIGS. 14 and 15 is formed by a record substrate formed by synthetic resin containing electric conductive toner. The disc record 98 is formed with a relatively fine spiral groove (e.g., groove width 2.6 micrometers). The groove is previously formed with geometric indentations to carry information of picture and/or sound. During playback, the keel-tipped stylus 30 engages the groove as the record is rotated by a supportive turntable (not shown), producing capacitive variations between the stylus electrode 34 and the conductive record disc. Such capacitive variations are sensed to reproduce the prerecorded information.

As apparent from FIGS. 14 and 15, the material for the electrode 34 undesirably deposited on the bevelled surfaces 36 and 38, particularly in a region close to the constricted terminal portion 48, during the deposition process can be removed during the lapping of the shoulders 40, 42, 44 and 46. Since a distance between the adjacent groove in the record disc and the first shoulder, e.g., 40 is relatively long, the capacitance therebetween is very small and, therefore, the undesirably deposited material still remaining above the first shoulders 40 and 42 may not sense the information carried in the adjacent grooves.

Figure 16:
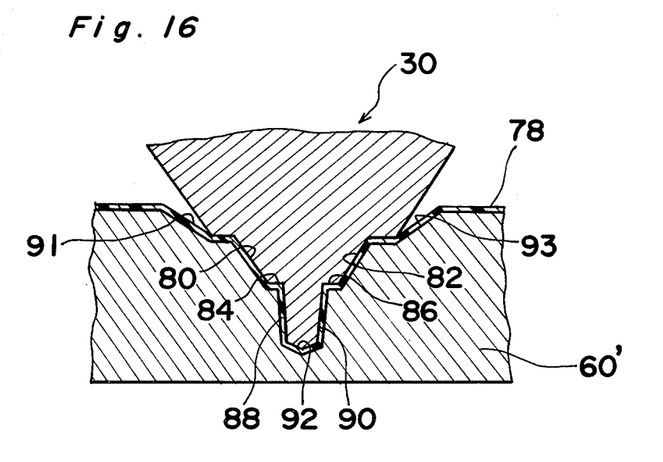
FIG. 16 is a view similar to FIG. 7, but particularly showing another embodiment thereof.

Referring to FIG. 16, there is shown another embodiment of the abrasive lapping disc 60' which further has flared walls 91 and 93 relative to the bottom wall 92 so as to further widen the opening of the groove 74. When this embodiment is employed, the engagement between the V-shaped stylus and the groove 74 can be done with a higher percentage.

Next the steps for manufacturing the V-shaped stylus 30' is explained.

Figure 17:
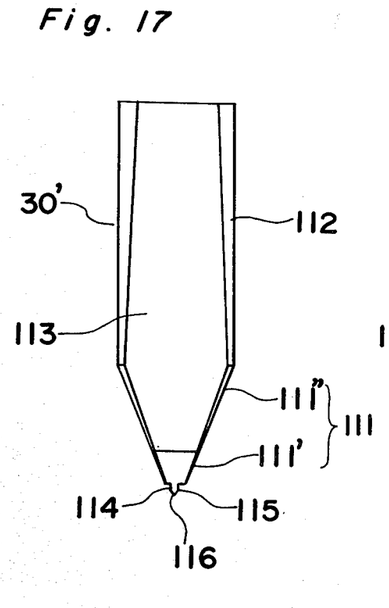
FIGS. 17 and 18 are front and side views, respectively, of a V-shaped stylus.
Figure 18:
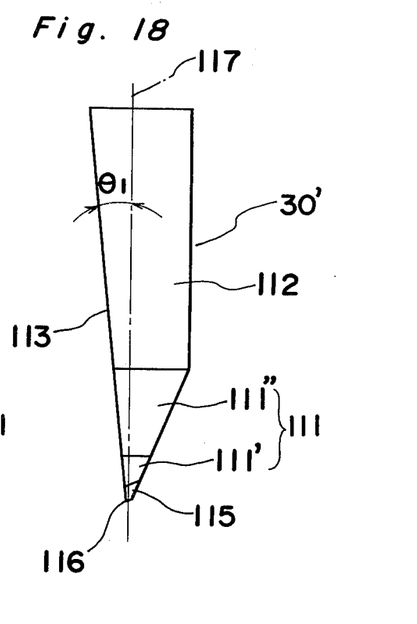
Figure 19:
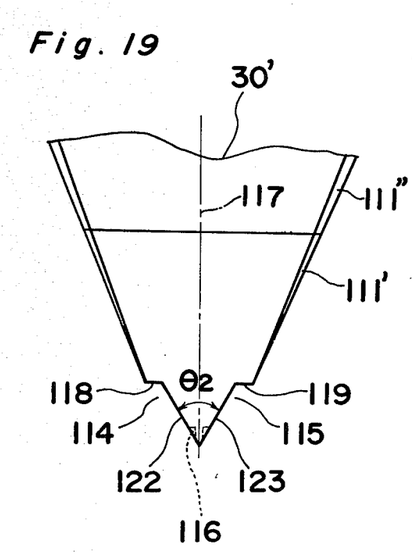
FIGS. 19, 20 and 21 are front, side and rear views, respectively, of a tapered end portion of the V-shaped stylus of FIGS. 17 and 18.
Figure 20:
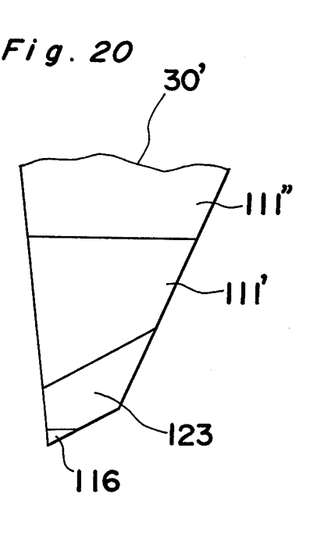
Figure 21:
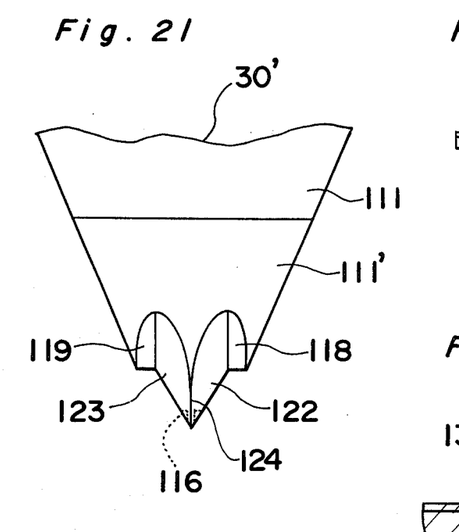

Referring to FIGS. 17 and 18, there is shown a configuration of the V-shaped stylus 30' which is formed by an elongated body having a tapered portion 111 (A lower tip end portion 111' of the tapered portion 111 is formed by, e.g., diamond and an upper portion 111" thereof is formed by, e.g., titanium material.) and a semi-cylindrical portion 112. The body is further defined by a plane 113 which extends over both the semi-cylindrical portion 112 and the tapered portion 111, and a pair of recesses 114 and 115 at the pointed end of the tapered portion 112. The plane 113 is slanted by an angle $\theta 1$ (e.g., 5–18 degrees) with respect to the axis 117 of the elongated body. An electrode film (not shown) made of, e.g., titanium material is deposited entirely on the plane 113 by any known depositing technique. The recesses 114 and 115 are formed symmetrically when viewed in FIG. 17 and, as shown in FIGS. 19, 20 and 21, the recesses 114 and 115 are defined by a pair of shoulders 118 and 119 that extend inwardly towards the axis 117 and a pair of tapered surfaces 122 and 123. The tapered surfaces 122 and 123 are intersected with each other along a prow line 124 which is substantially aligned along the axis 117.

As best shown in FIG. 21, a tip end portion 116 of the tapered end is formed with keel-tipped end, e.g., in a manner described above. A dotted line shown in the tip end portion 116 shows the keel-tipped end.

Figure 22:
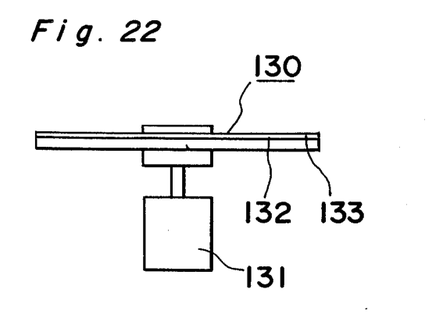
FIG. 22 is a diagrammatic view of a device for making the V-shaped stylus.
Figure 23:
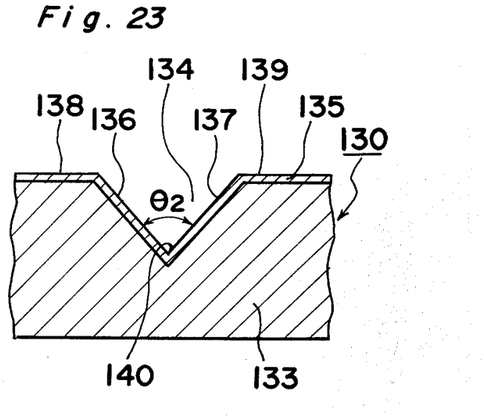
FIG. 23 is a cross-sectional view taken along a radial direction of an abrasive lapping disc for lapping and forming the V-shaped stylus of FIGS. 19, 20 and 21.
Figure 24:
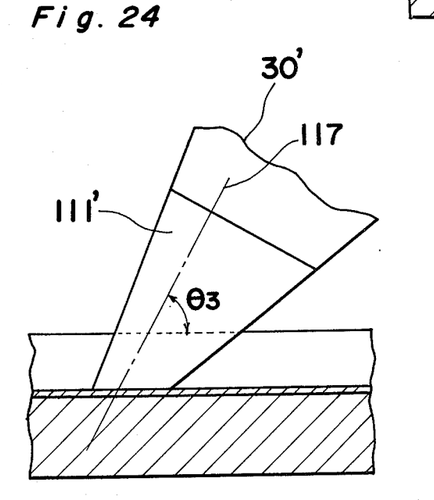
FIG. 24 is a diagrammatic view showing a manner in which the V-shaped stylus engages a groove formed in the abrasive lapping disc.

Referring to FIGS. 22, 23 and 24, there is shown a device for forming the recesses 114 and 115, in which FIG. 22 shows a diagrammatic view of the device, FIG. 23 shows a cross-sectional view of an abrasive lapping disc taken in a radius direction of the disc, and FIG. 24 shows a side view of a V-shaped stylus 30' having being lapped and also a cross-sectional view of a abrasive groove taken in a groove extending direction.

As shown in FIG. 22, the abrasive lapping disc 130 is supported on a turntable 132 which rotates at a high speed by a motor 131. The abrasive lapping disc 130 is formed by a substrate 133 made of plastic or metal, and a spiral groove 134 (FIG. 23) having a V-shape cross-section formed on a flat surface of the disc. It is to be noted that the groove 134 can be presented in a form of concentric circles. Furthermore, a pair of side walls 136 and 137 defining the groove 134 contain an angle $\theta 2$ which is, e.g., 30–90 degrees.

A hard and brittle abrasive material, such as grain of diamond is deposited or coated on the plate to form an abrasive layer 135. A material for forming the V-shaped stylus 30' is engaged in the groove 134 such that an angle $\theta 3$ between the axis 117 of the material and the plane of the lapping disc 130 is adjusted to a predetermined degree, e.g., 20–70 degrees. As the disc 130 rotates with a predetermined pressured applied on the material, the groove 134 laps the tip end of the material to define the recesses 114 and 115, thus presenting a V-shaped stylus 30'. By using the above device, it is possible to form the recesses 114 and 115 in a single manufacturing step. More specifically, the side walls 136 and 137 lap the tapered surfaces 122 and 123, and a pair of lands 138 and 139 on the opposite sides of the groove 134 lap the shoulders 118 and 119. Furthermore, a bottom corner 140 of the groove 134 forms the prow line 124. Therefore, by using the abrasive lapping disc 130 having a groove 134 and a pair of lands 138 and 139 on opposite sides of the groove 134, it is possible to automatically obtain a well sharpened V-shaped stylus 30' once the material for the stylus is adjusted in a position for the lapping. In particular, during the lapping, the pressure on the pointed tip will be lightened by the engagement between the lands 138 and 139 and the shoulders 118 and 119, respectively, and therefore, the pointed tip will not be undesirably lapped to form a rounded tip, even if the lapping disc 130 makes pitching or swerving motion.

It is to be noted that the abrasive lapping disc 130 can be formed by a drum having grooves formed on an outer curved face.

Figure 25:
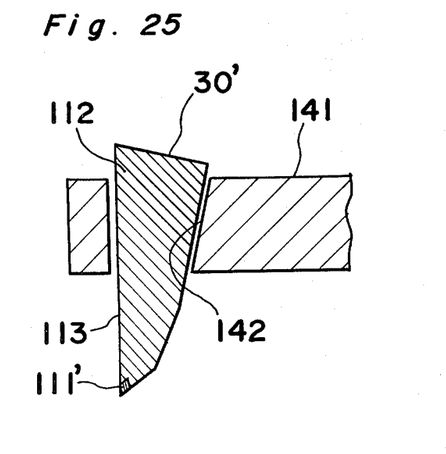
FIG. 25 is a cross-sectional view showing a V-shaped stylus supported by a holder.

Referring to FIG. 25, there is shown a condition in which the V-shaped stylus 30' is attached to a stylus holder 141. Since there is a plane 113 formed on the V-shaped stylus 30', the direction of the stylus 30', when it is held by the holder 141, can be easily determined. Furthermore, by a contact between the semi-cylindrical portion 112 and a wall 142 of the holder 141, it is possible to regulate an amount of extrusion of the stylus 30' from the holder 141. Therefore, the step for attaching the V-shaped stylus 30' to the holder 141 can be simplified.

Figure 26:
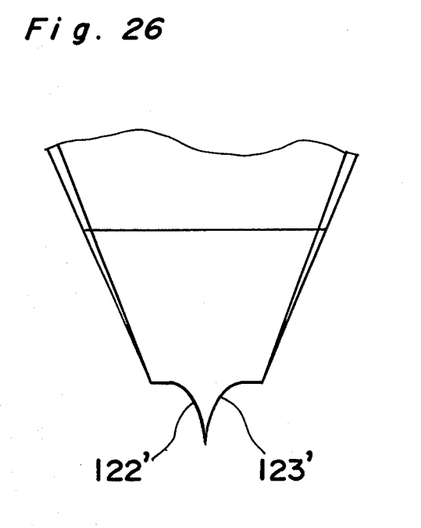
FIGS. 26, 27 and 28 are front, side and rear views, respectively, of a tapered end portion of a V-shaped stylus according to one modification.
Figure 27:
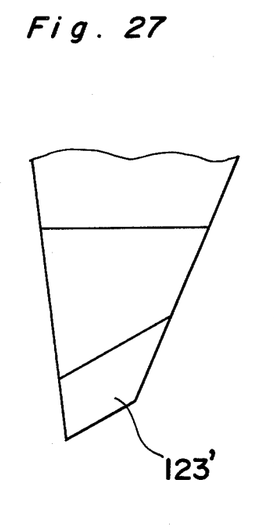
Figure 28:
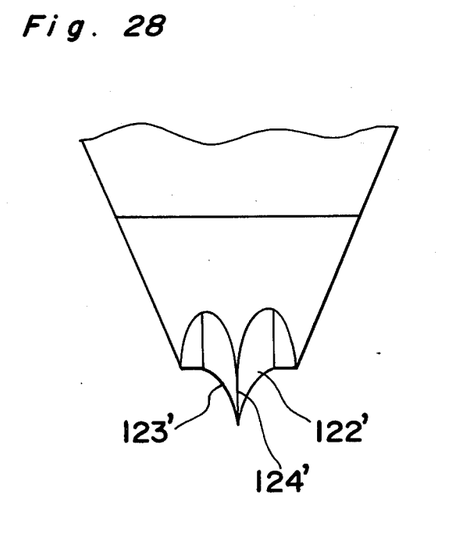

Referring to FIGS. 26, 27 and 28, there is shown a modified V-shaped stylus. The V-shaped stylus shown has a pair of tapered surfaces 122' and 123' which are so curved inwardly as to present an acute prow 124'. Such a V-shaped stylus can be obtained by forming an abrasive groove having a corresponding curvature on its side walls.

Figure 29:
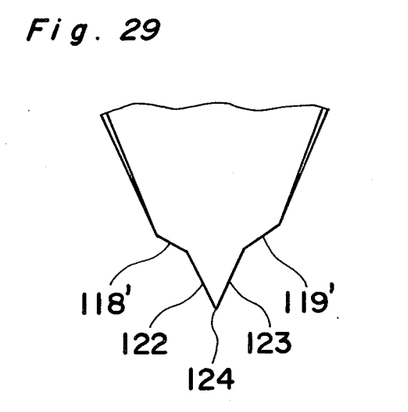
FIGS. 29, 30 and 31 are front, side and rear views, respectively, of a tapered end portion of a V-shaped stylus according to another modification.
Figure 30:
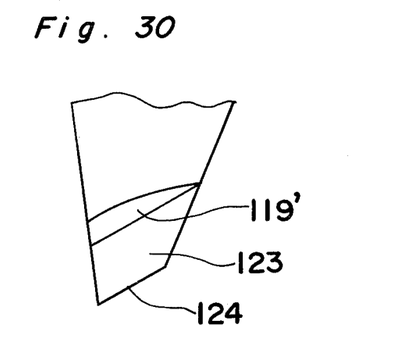
Figure 31:
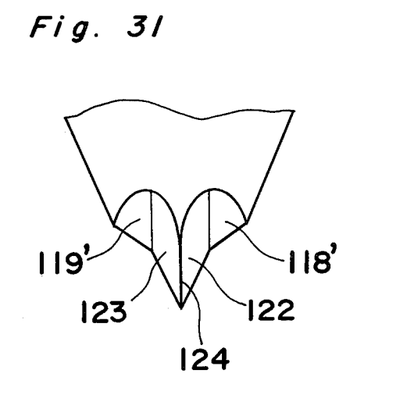
Figure 35:
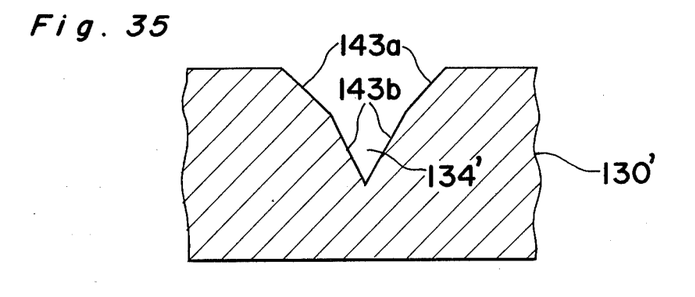
FIG. 35 is a cross-sectional view taken along a radial direction of an abrasive lapping disc for lapping and forming the V-shaped stylus of FIGS. 29, 30 and 31.

Referring to FIGS. 29, 30 and 31, there is shown another modified V-shaped stylus. The V-shaped stylus shown has a pair of shoulders 118' and 119' which are flared relative to the prow 124 so that an angle contained between the shoulder, e.g., 118' and side surface 122 is an obtuse angle. The stylus shown can be obtained by the use of abrasive lapping disc 130' having a groove 134' as shown in FIG. 35. Each side of the groove 134' is defined by upper and lower walls 143a and 143b having a different slope. As apparent from FIG. 35, the lower wall 143b is steeper than the upper wall 143a. Therefore, it is possible to widen the opening of the groove and, thus, the engagement of the material for forming the V-shaped stylus into the groove can be carried out easily. Furthermore, by the steep walls 143b, an acute prow can be obtained.

Figure 32:
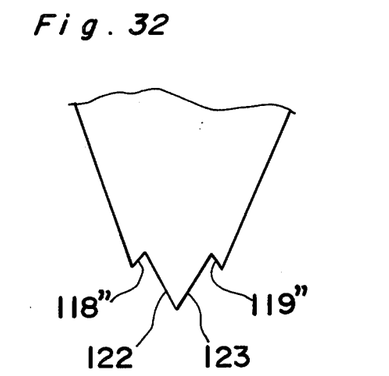
FIGS. 32, 33 and 34 are front, side and rear views, respectively, of a tapered end portion of a V-shaped stylus according to a further modification.
Figure 33:
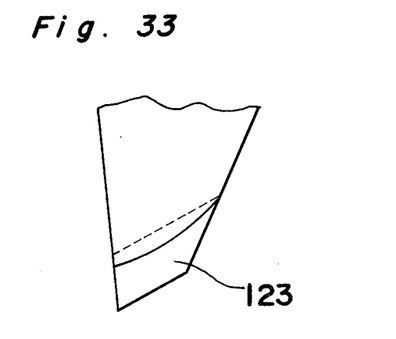
Figure 34:
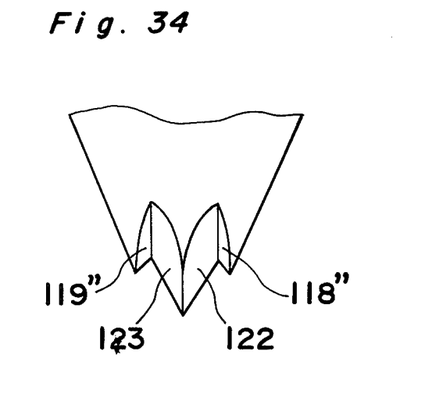
Figure 36:
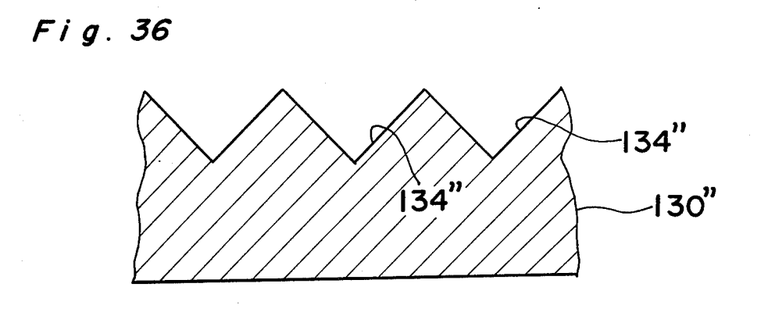
FIG. 36 is a cross-sectional view taken along a radial direction of an abrasive lapping disc for lapping and forming the V-shaped stylus of FIGS. 32, 33 and 34.

Referring to FIGS. 32, 33 and 34, there is shown a further modified V-shaped stylus which has a pair of shoulders 118" and 119" so slanted with respect to the tapered surfaces 122 and 123 as to define an acute angle therebetween. The V-shaped stylus according to this modification can be obtained by the use of abrasive lapping disc 130" having a groove 134" as shown in FIG. 36. Since the disc 130" has no land portion, the material for forming the V-shaped stylus can be engaged in the groove 134" without any failure.

Figure 37:
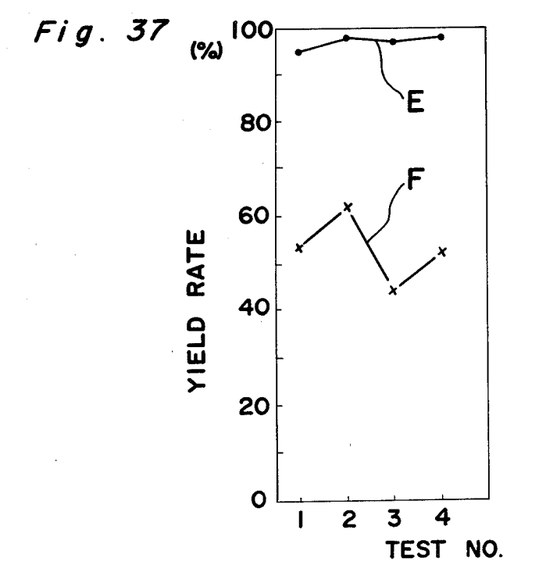
FIG. 37 is a graph showing a yield rate of V-shaped stylus according to the prior art and the same according to the present invention.

According to the tests carried out by the present inventors, the yield rate of V-shaped styli according to the method and device described above showed very high percentage, when compared with prior art method and device, as shown in graph of FIG. 37. In the graph of FIG. 37, abscissa and ordinate represent test number and yield rate in percentage, respectively. In the graph of FIG. 37, a line E shows percentages of V-shaped styli prepared according to the above described method and device and, a line F shows percentage of V-shaped styli prepared according to the prior art method and device. As apparent from the graph, the yield rate of the V-shaped styli prepared by the method and device described above is much high than the yield rate according to the prior art. Therefore, by employing the above described method and device, it is possible to reduce the manufacturing cost of the V-shaped styli.

Since the method for forming the V-shaped stylus describe above can be carried out in two steps, the manufacturing step can be simplified. Furthermore, according to the device for forming the V-shaped stylus described above, the stylus can be held in a proper position with respect to the stylus holder without any difficulty. Moreover, a plurality of V-shaped styli can be formed at a time and, therefore, the method and device is suitable for the mass production.

Although the present invention has been fully described with reference to several preferred embodiments, many modifications and variations thereof will now be apparent to those skilled in the art, and the scope of the present invention is therefore to be limited not by the details of the preferred embodiments described above, but only by the terms of appended claims.

What is claimed is:

1. A keel-tipped stylus for reading prerecorded information on a disc record groove, said keel-tipped stylus comprising:
   a body made of electrically non-conductive, hard and brittle material, said body comprising:
      first and second surfaces bevelled with each other and intersecting at a prow line;
      a front surface extending between said first and second bevelled surfaces with a predetermined acute angle contained between said prow line and said front surface, said front surface being tapered;
      a pair of first shoulders extending, respectively, from opposite sides of said front surface to said first and second bevelled surfaces;
      a pair of second shoulders provided adjacent to said first shoulders on a tapered side and extending, respectively, from opposite sides of said front surface to said first and second bevelled surfaces;
      a pair of first side surfaces joining said first shoulders to said second shoulders, respectively; and
      a fore-and-aft constricted terminal portion defined by a pair of second side surfaces extending from said second shoulders, respectively, and a bottom surface extending between said second side surfaces; and
   an electric conductive film, deposited on said front face of the body.

2. A keel-tipped stylus as claimed in claim 1, wherein said first and second shoulders are parallel to each other.

3. A keel-tipped stylus as claimed in claim 1, wherein said first side surfaces are tapered towards said constricted terminal portion.

4. A keel-tipped stylus as claimed in claim 1, wherein said second side surfaces are tapered towards said bottom surface.

5. A keel-tipped stylus as claimed in claim 1, wherein said second side surfaces are parallel to each other.

6. A keel-tipped stylus as claimed in claim 1, wherein said bottom surface is defined by a pair of slanted surfaces which contain an obtuse angle.

7. A keel-tipped stylus as claimed in claim 1, wherein said body has a symmetric configuration about its axis extending from the center of the bottom surface.

8. A keel-tipped stylus for reading prerecorded information on a disc record groove, said keel-tipped stylus comprising:
   a body made of electrically non-conductive, hard and brittle material, said body comprising:
      first and second surfaces bevelled with each other and intersecting at a prow line;
      a front surface extending between said first and second bevelled surfaces with a predetermined acute angle contained between said prow line and said front surface, said front surface being tapered;
      a first shoulder extending from one opposite side of said front surface to said first bevelled surface;
      a pair of second shoulders provided adjacent to said first shoulder on a tapered side and extending from opposite sides of said front surface to said first and second bevelled surface, respectively;
      a first side surface joining said first shoulder to one of said second shoulder; and
      a fore-and-aft constricted terminal portion defined by a pair of second side surfaces extending from said second shoulders, respectively, and a bottom surface extending between said second side surfaces; and
   an electric conductive film, deposited on said front face of the body.

* * * * *